(12) United States Patent
Martens

(10) Patent No.: US 7,793,159 B2
(45) Date of Patent: Sep. 7, 2010

(54) METHOD, COMPUTER PROGRAM PRODUCT, AND COMPUTER SYSTEM FOR DETECTING A CORRUPTION IN A DATA BLOCK STORED BY A TAPE RECORDING APPARATUS

(75) Inventor: Holger Martens, Lonsheim (DE)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 11/769,963

(22) Filed: Jun. 28, 2007

(65) Prior Publication Data

US 2008/0082862 A1 Apr. 3, 2008

(30) Foreign Application Priority Data

Oct. 2, 2006 (EP) .................................. 06121596

(51) Int. Cl.
*G06F 11/00* (2006.01)
*G06F 11/277* (2006.01)

(52) U.S. Cl. .................. 714/44; 717/3; 717/30; 717/719; 717/824

(58) Field of Classification Search ............ 714/3, 714/30, 52, 824, 719, 44
See application file for complete search history.

(56) References Cited

U.S. PATENT DOCUMENTS

| | | | | |
|---|---|---|---|---|
| 3,794,818 A | * | 2/1974 | Kennedy | 714/824 |
| 4,672,483 A | * | 6/1987 | Kawada | 360/51 |
| 5,200,960 A | * | 4/1993 | Hamilton | 714/735 |
| 5,557,740 A | * | 9/1996 | Johnson et al. | 714/38 |
| 6,115,206 A | * | 9/2000 | Leggett | 360/92.1 |
| 6,307,701 B1 | * | 10/2001 | Beavers et al. | 360/73.08 |
| 6,557,141 B1 | * | 4/2003 | Gill et al. | 714/771 |
| 2002/0154433 A1 | * | 10/2002 | Gill et al. | 360/53 |
| 2005/0201015 A1 | * | 9/2005 | Rushton et al. | 360/246.6 |

FOREIGN PATENT DOCUMENTS

CN 1708030 A 12/2005

OTHER PUBLICATIONS

Chinese Office Action citing CN1708030A as prior art.

* cited by examiner

*Primary Examiner*—Scott T Baderman
*Assistant Examiner*—Joseph Schell
(74) *Attorney, Agent, or Firm*—Anthony V. S. England; William H Steinberg

(57) ABSTRACT

In a tape recording apparatus having a write head and a read head, a data block is stored by writing to a tape via the write head. The tape moves past the write head in a predetermined direction and writes a first data block responsive to transmitting the first data block from the computer system. The read head then reads the written data block from the tape. For reading, the tape moves past the read head in the same, predetermined direction as the writing, and the reading of the first data block occurs without reversing the tape movement after the writing of the first data block. Portions of the transmitted and read data blocks are compared and a corruption indication is sent responsive to the comparing.

15 Claims, 5 Drawing Sheets

METHOD, COMPUTER PROGRAM PRODUCT, AND COMPUTER SYSTEM FOR DETECTING A CORRUPTION IN A DATA BLOCK STORED BY A TAPE RECORDING APPARATUS

FIELD OF THE INVENTION

The invention relates to methods of detecting a corruption in a data block. In other aspects the invention relates to computer program products adapted to perform the methods in accordance with the invention, to a data processing system, and to a tape recording apparatus.

BACKGROUND ART

It is known to backup data stored on a primary storage such as a hard disc of a computer system on a magnetic tape, which is accessed via a tape recording apparatus. One of the main reasons for using magnetic tapes as a backup storage medium is that it provides a stable, reliable and relatively cheap option for storing large volumes of backed-up data.

An application which is a computer program product hosted by a computer system that is linked with the tape recording apparatus can provide the data to be backed-up via the drivers of the tape recording apparatus to the tape recording apparatus. The data is typically provided as a sequence of data blocks, wherein each data block has a pre-given block size, e.g., 256 kilobytes.

The data blocks provided by the application are according to prior art written by the tape recording apparatus to the tape drive and only checked for writing errors on the tape recording apparatus side. The application itself does not check during the writing process if the written data blocks have been correctly written to the tape. This is done to keep the tape recording apparatus operating in streaming mode so that the write throughput and correspondingly the performance of the tape recording apparatus is kept at a high level. In order to verify that the data blocks have not been corrupted and written correctly to the tape recording apparatus, the application can read the complete tape again. This is usually done when the tape recording apparatus is not used for backup operations and might be days, weeks or even years later with respect to the point in time when the data have been provided to the tape recording apparatus. This is from an application point of view not ideal as, when the corruptions are detected, the initial data that has been stored might not be available anymore.

There is, therefore, a need for an improved method of detecting a corruption in a data block and for an improved data processing system that allows for the detection of corruptions, in particular right after the data block has been written to the tape. There is, therefore, further a need for an improved tape recording apparatus.

SUMMARY OF THE INVENTION

The foregoing need is addressed in the present invention. According to one form of the invention, corruption is detected in a data block stored by a tape recording apparatus having a write head and a read head. The tape recording apparatus writes to a tape via the write head. The tape moves past the write head in a predetermined direction and writes a first data block responsive to transmitting the first data block from the computer system. The read head then reads the written data block from the tape. For reading, the tape moves past the read head in the same, predetermined direction as the writing, and the reading of the first data block occurs without reversing the tape movement after the writing of the first data block. Portions of the transmitted and read data blocks are compared and a corruption indication is sent responsive to the comparing.

In another aspect, the tape recording apparatus is linked with a computer system executing an application and a device driver. The tape recording apparatus is accessible by the application through the device driver via first and second tasks. Writing the first data block includes writing by the first task, including storing the data block read from the tape in a memory buffer of the tape recording apparatus, and reading, via the second task, the data block stored in the memory buffer. The comparing includes comparing portions of the transmitted data block and the data block read from the memory buffer.

In another aspect, additional data blocks are transmitted and written to the tape. When sending a corruption indication, a first message is sent to the first task. The first message indicates that the read data block has been stored incorrectly. The transmitting of data blocks via the first task is aborted in response to the reception of the first message. The first data block is re-transmitted to the tape recording apparatus via the first task. The first data block is responsively re-written to the tape, including overwriting the first data block or invalidating the first data block, and appending the re-transmitted first data block on the tape.

In another aspect, the reading of the data block stored in the memory buffer includes reading after an Input/Output message or interrupt signal is received by the second task from the tape recording apparatus.

In another aspect, a first cyclic redundancy check is performed on first data prior to the writing of the first block to the tape. Second data is generated responsive to the cyclic redundancy check. The first data block written to the tape includes the first and second data, and the comparing portions of the transmitted and read data blocks includes performing a second cyclic redundancy check on the first data of the data block read from the tape.

In another aspect, comparing portions of the transmitted and read data blocks includes comparing each respective bit of the transmitted and read data block.

In another aspect, the earlier described writing, reading, comparing, and sending for additional data blocks is repeated. The memory buffer tends to fill if storing to the memory buffer exceeds reading from the memory buffer. The moving of the tape is at a first speed responsive to filling of the memory buffer not exceeding a limit, and slows responsive to filling of the memory buffer exceeding the limit.

According to another form of the invention, a computer program product concerns detecting corruption in a data block. The computer program product has instructions stored on a tangible, computer-readable medium for execution by the computer to perform method steps such as described above.

According to another form of the invention, a computer system includes a processor and a storage device connected to the processor. The storage device has stored thereon corruption detection in a data block program for controlling the processor to perform method steps such as described above.

Other variations, objects, advantages, and forms of the invention will become apparent upon reading the following detailed description and upon reference to the accompanying drawings.

BRIEF DESCRIPTION OF DRAWINGS

In the following preferred embodiments of the invention will be described in greater detail by way of example only making reference to the drawings in which.

DETAILED DESCRIPTION OF THE PREFERRED EMBODIMENT

Figure 1:
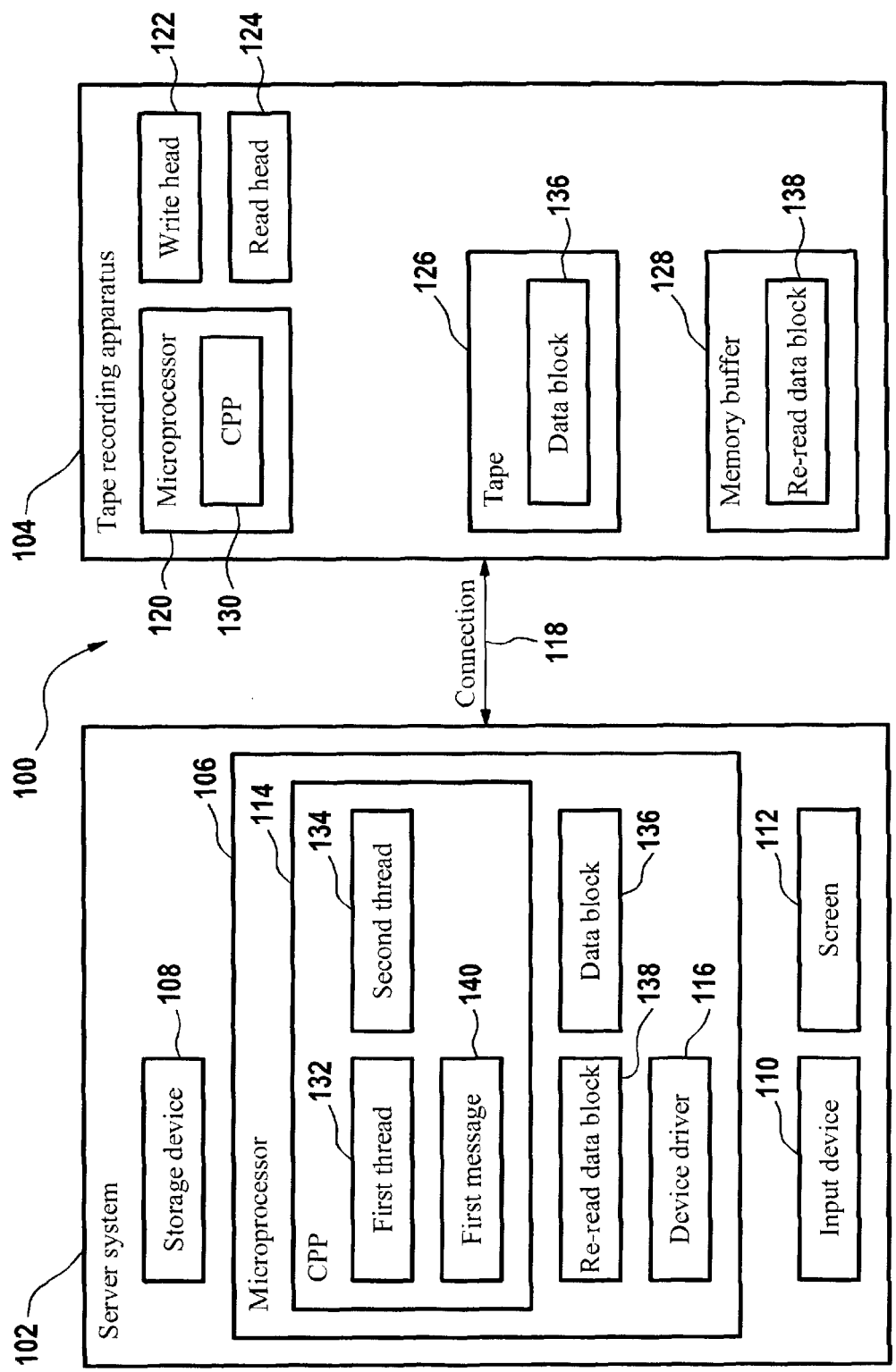
FIG. 1 shows a block diagram of a data processing system.

In accordance with an embodiment of the invention, there is provided a method of detecting a corruption in a data block to be stored by a tape recording apparatus. The tape recording apparatus comprises a write head, a read head, and a memory buffer. The tape recording apparatus is further linked with a server system, which executes an application and a device driver. The tape recording apparatus is accessible by the application through the device driver via a first task and a second task. The method in accordance with the invention comprises the step of transmitting the data block to the tape recording apparatus via the first task, wherein the tape recording apparatus writes the data block by use of the write head to a tape, wherein the tape recording apparatus reads the written data block from the tape by use of the read head, and wherein the tape recording apparatus stores the re-read data block in the memory buffer. In a further step, the re-read data block is read via the second task from the memory butter. The data block and the re-read data block are then compared on the application side, wherein the corruption is detected if the comparison of the data block and the re-read data block reveals a difference.

The method in accordance with the invention is particularly advantageous as the data block is re-read more or less directly after it has been written to the tape and provided to the second task so that it can be checked by the application for corruptions without repositioning the tape (e.g. rewinding) and without interrupting writing to tape. Thus, a corruption in the data block can be detected basically in real time without impacting write throughput (performance) of the tape drive apparatus. A data block is thereby identified as being corrupted when the comparison between the original data block and the re-read data block reveals a difference. The corruption might be, e.g., due to a writing error or to a change of the data comprised in the data block during the transfer of the data block from the server system to the tape drive apparatus, e.g., via a storage area network (SAN).

The first task and the second task are simultaneously or pseudo simultaneously running tasks that are generated by the application. The first and second task can relate to, e.g., threads, sub-programs or (child) processes that are generated by the application or forked from the application. If a thread or a process can be generated from the application depends basically on the underlying operating system.

In accordance with an embodiment of the invention, the method further comprises the step of aborting the transmission of further data blocks via the first task, if the comparison of the data block and the re-read data block reveals a difference. Then a first message is sent to the first task via the second task, wherein the first message indicates that the data block has been stored incorrectly. The data block is re-transmitted again to the tape recording apparatus via the first task, so that the initially stored data block can be overwritten by the re-transmitted data block or the initially stored data block can be marked damaged, re-transmitted and appended, e.g., in case of "write once-read multiple" (WORM) media. The replacement of the data block by the re-transmitted data block right alter it has been detected that the data block has been stored incorrectly on the tape provides the advantage, that when all data blocks to be stored by the application are written to the tape, the tape can be archived and must not be re-read again in order to check for any corruptions.

In accordance with an embodiment of the invention, the re-read data block is read by the second task from the memory buffer in response to the reception of an input/output message or interrupt signal, wherein the input/output message or interrupt signal is sent from the tape recording apparatus to the server system. The tape recording apparatus can only be employed by one task. Thus, only the first task communicates directly with the tape recording apparatus in matter of controlling the tape recording apparatus. The tape recording apparatus is furthermore adapted to check internally, if the writing of the data block has been successful and error free. The tape recording apparatus signals then to the second task by use of the input/output message or interrupt signal that it has provided the data block in the memory buffer. This provides the advantage that on one hand the second task is informed by the tape recording apparatus that it should read out data from the memory buffer and check for data block corruptions while on the other hand only the first task is able to write data blocks and to sent messages including instructions to the tape recording apparatus.

In accordance with an embodiment of the invention, the data block comprises first data and second data, wherein the second data provides information about a cyclic redundancy check, wherein the application performed the cyclic redundancy check on the first data before the data block has been transmitted to the tape recording apparatus via the first task, wherein the second application task generates third data by performing a further cyclic redundancy check on the first data comprised in the re-read data block, and wherein the data block and the re-read data block are compared by a comparison of the second and third data. The application thus receives the first data to be stored from another application, which has actually created the first data. A cyclic redundancy check is then performed on the first data, whereby the second data is generated. The data block comprising the first and second data is then transmitted to the tape recording apparatus. The first data is then extracted from the re-read data block and third data is generated by performing a second cyclic redundancy check on the first data. If the third data matches the second data, then the first data of the re-read data block matches the first data initially received by the other application and hence the first data has been stored and archived correctly on the tape. If the third data mismatches the second data, then the first data of the re-read data block might differ from the first data initially received by the other application and hence the first data has to be rewritten to the tape.

In accordance with an embodiment of the invention, the data block is stored on the server system and the data block is compared with the re-read data block directly, e.g., via a bitwise comparison of the stored data block and the re-read data block. The stored data block is then deleted after the comparison has been performed. The usage of a cyclic redundancy check as described in the previous embodiment provides the advantage that the data block must not be kept on the application side as the data block and the re-read data block are compared via a comparison of the second data and the third data. The first data is the data that should be backed-up on the tape. The second data is the data that is generated before the writing of the data block from the first data, and the third data is the data that is generated from the first data after the data block has been re-read. Thus, the information needed to check the data block is kept in the second data and stored on the tape. In contrast, the keeping the data block on the server side provides the advantage that the steps of determining the second and third data do not have to be performed. This might increase the overall performance of the server system as CPU time for determining the second and third data is not required.

In another aspect, the invention relates to a computer program product that comprises computer executable instructions for performing the above described method in accordance with the invention.

In a further aspect the invention relates to a method of detecting a corruption in a data block to be stored by a tape recording apparatus, wherein the tape recording apparatus comprises a write head, a read head, and a memory buffer. The tape recording apparatus is adapted to receive a tape and is linked with the server system. The server system executes an application and a device driver. The tape recording system is accessible by the application through the device driver via a first task and a second task, and the method in accordance with the invention comprises the step of receiving the data block from the first task. Further the data block is written to the tape by use of the write head, and re-read again from the tape by use of the read head. In a further step, the re-read data block is stored on the memory buffer and provided to the second task without interrupting the application writing to tape.

In accordance with an embodiment of the invention, a memory buffer management is implemented preventing the tape drive from running out of memory buffer space. The re-read data blocks are placed into the memory buffer using first-in/first out (FIFO) algorithm. Low and high threshold values which are also denoted as low and high water marks are defined for memory buffer management. As long as re-read data blocks fill up the memory buffer so that the filling level of the memory buffer does not reach the low water mark, the tape recording apparatus operates at maximum write speed. As soon as the filling level reaches the low water mark, the tape drive starts slowing down writes. This results into less re-read data blocks put into the memory buffer by the tape recording apparatus because if less data blocks are written less data blocks are re-read and placed into the memory buffer. The tape recording apparatus is dynamically adjusting its write throughput depending on memory buffer utilization between low and high water mark. The tape recording apparatus is (minimally) slowing down writing data blocks to tape in case memory buffer utilization is equal to low water mark defined. The tape recording apparatus more and more slows down writing data blocks to tape until maximum slow down is reached at the point the filling level reaches the high water mark. As soon as the memory buffer utilization reaches the high water mark defined, the tape recording apparatus may stop writing data blocks to the tape or may start deleting re-read data blocks from the memory buffer. Deleting re-read data blocks from the memory buffer is done using a FIFO algorithm (oldest re-read data block in memory buffer is deleted first). When writing data blocks to tape is stopped, then the application can validate all data blocks in memory buffer but the write throughput of the tape recording apparatus is negatively affected. In contrast, when re-read data blocks are deleted from the memory buffer, the application is not able to validate all re-read data blocks the impact on the write throughput is minimized. How the tape recording apparatus behaves when memory buffer utilization reaches the high water mark defined can be controlled by the application by sending instructions to the tape recording apparatus.

In accordance with an embodiment of the invention, the re-read data block is deleted from the memory buffer after the second task has read the re-read data block from the memory buffer. As the memory buffer shall provide the data to the second task, the re-read data block can be deleted after it has been read out by the second task in order to not waste any storage space on the memory buffer.

In accordance with an embodiment of the invention, the method in accordance with the invention comprises the step of receiving instructions from the first task, wherein the instructions comprise information about the handling of the data block in the memory buffer.

In accordance with an embodiment of the invention, the method in accordance with the invention further comprises the step of detecting the dismounting of the tape recording apparatus by the first task and the step of signaling the dismount to the second task. The second task is only reading data blocks that have been placed into the memory buffer of the tape recording apparatus. The second task is not positioning the tape drive and is not sending any control commands to the tape recording apparatus, as there is no need to. If no data is available in the memory buffer, the second task just waits until data becomes available or the tape is dismounted. In case there is no synchronization between the first task and the second task there must be a mechanism to signal to the second task that the first task does not provide any further data blocks to the tape recording apparatus and that the second task can be aborted. This is done by signaling the dismount of the tape to the second task by input/output message or interrupt signal.

In a further aspect, the invention relates to a computer program product that comprises computer executable instructions for performing the above mentioned method in accordance with the invention.

Furthermore, the invention relates to a data processing system that comprises a tape recording apparatus and a server system. The tape recording system comprises a write head, a read head, and a memory buffer and the tape recording apparatus is linked with the server system. The server system is adapted to execute an application and a device driver and the tape recording system is accessible for the application through the device driver via a first task and a second task. The data processing system further comprises means for transmitting a data block to the tape recording apparatus via the first task, wherein the tape recording apparatus writes the data block by use of the write head to a tape, wherein the tape recording apparatus reads the written data block from the tape by use of the read head, and wherein the tape recording apparatus stores the re-read data block in the memory buffer. The data processing system further comprises means for reading the re-read data block via the second task from the memory buffer and means for comparing the data block and the re-read data block, wherein the corruption is detected if the comparison of the data block and the re-read data block reveals a difference.

In another aspect, the invention relates to a tape recording apparatus which comprises a write head, a read head, a memory buffer and which is adapted to receive a tape. The tape recording apparatus is linked with the server system, which is able to execute an application and a device driver. The tape recording system is accessible by the application through the device driver via a first task and a second task and the tape recording apparatus comprises a receiving component for receiving the data block from the first task. The tape recording apparatus further comprises a writing component for writing the data block to the tape by use of the write head and a reading component for reading the data block from the tape by use of the read head. Furthermore the tape recording apparatus comprises a storing component for storing the re-read data block on the memory buffer and means for providing the re-read data block to the second task.

FIG. 1 shows a block diagram of a data processing system 100. The data processing system 100 comprises a server system 102 and a tape recording apparatus 104. The server system 102 further comprises a microprocessor 106, a storage device 108, an input device 110, and a screen 112. The server system 102 can be seen as a computer system with which a user is able to interact by use of the input device 110 (a keyboard, a pointing device, or the like) and the screen 112.

The microprocessor 106 executes a computer program product 114 and a device driver 116 for the tape recording apparatus 104. Both, the computer program product 114 and the device driver 116 are stored permanently on the storage device 108 and are loaded into the microprocessor 106, e.g., when the above mentioned user requests to perform a backup of his data on the tape recording apparatus 104 or when the server system 102 is started up.

The server system 102 and the tape recording apparatus 104 are connected with each other by connection 118. The connection 118 can for example be a SCSI cable or a connection via a network such as a storage area network (SAN).

The tape recording apparatus 104 comprises a microprocessor 120, a write head 122, a read head 124, a tape 126, and memory buffer 128. The write head 122 and the read head 124 are arranged so that the read head 124 is able to read a data block from the tape, which has been written before by the write head 122 without the need of rewinding the tape. Thus, the tape recording apparatus 104 can be operated in streaming mode and data blocks can therefore be written by the write head 122 to the tape 126 and re-read subsequently by the read head 124.

The microprocessor 120 of the tape recording apparatus 104 also executes a computer program product 130, which is permanently stored on a storage device (not shown in FIG. 1 for simplicity reasons) and loaded into the microprocessor 120 when the tape recording apparatus 104 is started up.

The computer program product 114 can be seen as an application that migrates data from the server system to the tape recording apparatus 104. For this, the computer program product 114 employs a first thread 132 and a second thread 134. In the embodiment described here, the first task and the second task therefore relate to the first and second threads, respectively. In operation, a data block 136 is transmitted to the tape recording apparatus 104 via the first thread 132. The first thread 132 transmits the data block 136 to the device driver 116, which further transfers the data block 136 via the connection 118 to the tape recording apparatus 104.

The computer program product 130 is adapted so that it is able to receive the data block 136 and so that it controls the write head 122 to write the data block 136 to the tape 126. The data block 136 is then re-read by the read head 124 and the re-read data block 138 is stored on the memory buffer 128 from where it is made accessible to the second thread 134.

The second thread 134 reads out the re-read data block 138 from the memory buffer 128. The data block 136 is then compared with the re-read data block 138. A corruption of data block 136 is revealed, if a difference is detected between the data block 136 and the re-read data block 138.

In case a corruption is detected, the second thread 134 sends a first message 140 to the first thread 132. The first message 140 indicates that the data block 136 has been written incorrectly. The first thread 132 aborts then the transmission of further data blocks. The data block 136 is retransmitted to the tape recording apparatus 104, the first thread 132 initiates the rewind of the tape 126 to the location where the data block 136 has been stored and after reception of the re-transmitted data block, the old data block 136 is overwritten and therefore replaced by the new, re-transmitted data block. In case of WORM tape media the corrupted data block cannot be overwritten. Therefore the corrupted data block is invalidated and the re-transmitted data block is appended to the end of data on tape.

In order to enable the first and second thread 132, 134 to employ the tape drive apparatus 104, the device driver 116 must create two separate device special files so that each thread can employ one of the device special files that relate to the tape recording apparatus 104. Thus the tape recording apparatus 104 is visible to the computer program product 114 from a logical point of view as two tape recording apparatuses. However, the second thread 134 does not communicate with the tape recording apparatus 104 in matter of controlling it. The second thread 134 only reads data blocks placed into the memory buffer 128; it is neither positioning the tape 126 to the write head 122 nor to the read head 124.

Figure 2:
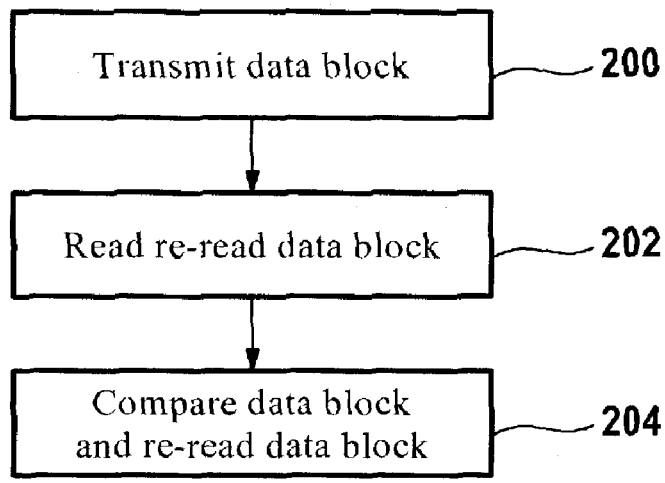
FIG. 2 shows a flow diagram illustrating basic steps of a method in accordance with an embodiment of the invention.

FIG. 2 shows a block diagram which illustrates basic steps performed by a method of detecting a corruption in a data block to be stored by a tape recording apparatus, wherein the tape recording apparatus comprises a write head, a read head, and a memory buffer, wherein the tape recording apparatus is linked with a server system, wherein the server system executes an application, and wherein the tape recording apparatus is accessible by the application via a first task and a second task. In step 200, the data block is transmitted to the tape recording apparatus via the first task. The tape recording apparatus writes the data block by use of the write head to a tape and reads the written data block again from the tape by use of the read head. The re-read data block is then stored on the memory buffer of the tape recording apparatus. In step 202 the re-read data block is read via the second task from the memory buffer. In step 204, the data block and the re-read data block is compared, wherein the corruption is detected if the comparison of the data block and the re-read data block reveals a difference.

Figure 3:
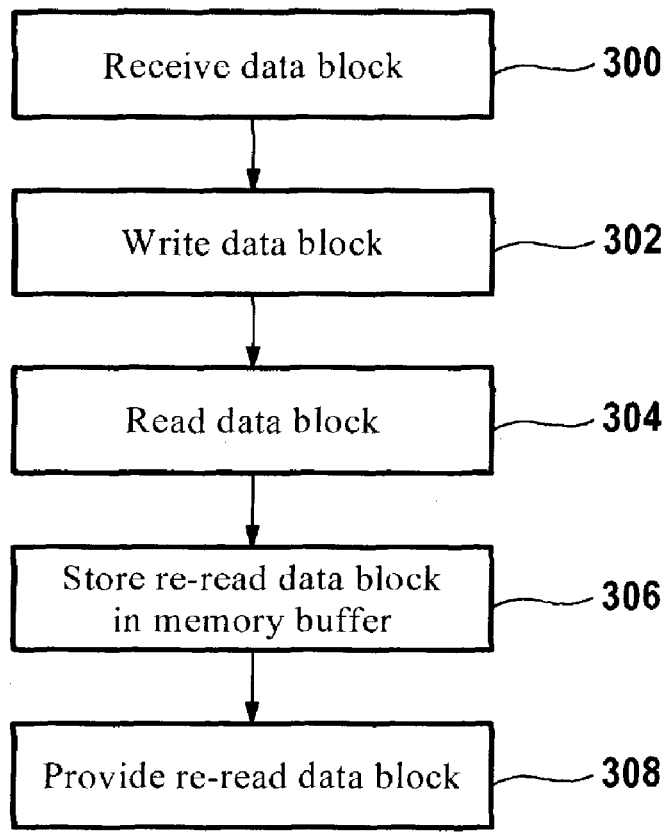
FIG. 3 shows a further flow diagram illustrating basic steps of a method in accordance with an embodiment of the invention.

FIG. 3 shows a block diagram, which illustrates basic steps performed by a method of detecting a corruption in a data block to be stored by a tape recording apparatus. The tape recording apparatus comprises a write head, a read head, and a memory buffer. The tape recording apparatus is linked with a server system. The server system executes an application; the tape recording system is accessible by the application via a first task and a second task. In step 300 performed by the method in accordance with the invention, the data block is received from the first task. In step 302 the data block is written to the tape by use of the write head, and in step 304 the data block is read from the tape by use of the read head. In step 306, the re-read data block is stored on a memory buffer of the tape recording apparatus. Furthermore, in step 308 the re-read data block is provided to the second task.

Figure 4:
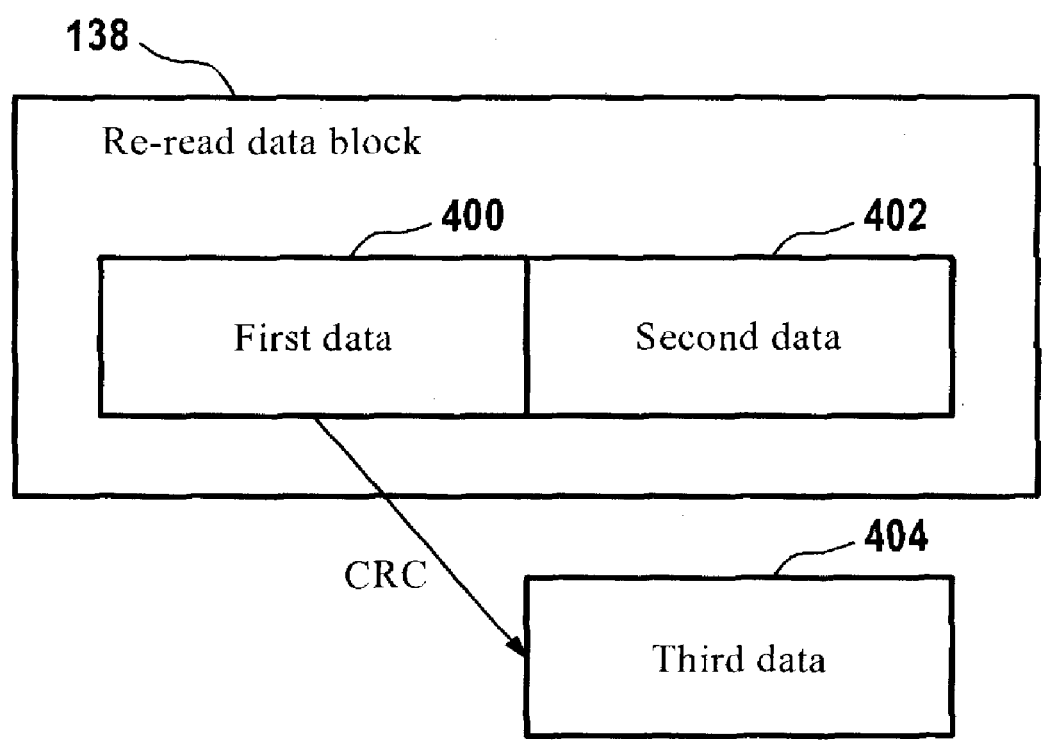
FIG. 4 shows schematically how the data block and the re-read data block are compared.

FIG. 4 illustrates how the data block 136 and the re-read data block 138 can be compared. In order to facilitate an understanding of the comparing process, reference is made to the components described in FIG. 1. The re-read data block 138 comprises first data 400 and second data 402. The first data 400 refers to the data that is initially received by the computer program product 114 and that shall be backed-up. The computer program product 114 performed a cyclic redundancy check on the first data 400 and thereby generated the second data 402. Thus the second data 402 has been added by the computer program product 114. The data block 136 comprising the first data 400 and the second data 402 is then transferred to the tape recording apparatus as already described in FIG. 1. The re-read data block 138 comprises then the first data 400 and the second data 402. As the first data 400 is the data to be backed-up, it is essential that no corruption occurred in the first data 400. In order to check for corruptions, the third data 404 is generated by performing again the cyclic redundancy check (CRC) as indicated by the arrow on the first data 400. The second data 402 is then compared with the third data 404. If the second and third data match, then the data block 136 has been written error free. Otherwise, the data block 136 has to be written again to the tape.

Figure 5:
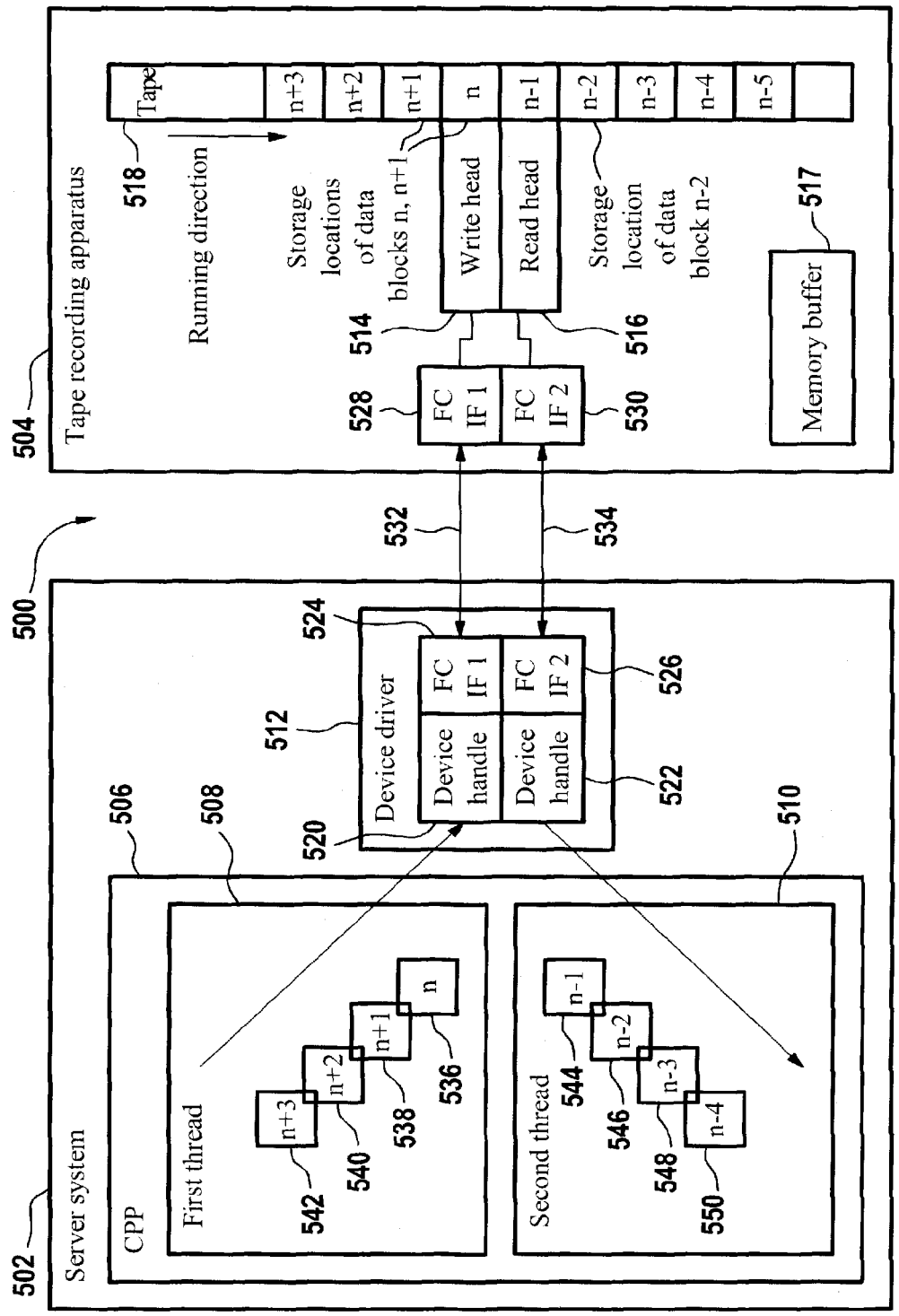
FIG. 5 shows another block diagram of a data processing system.

FIG. 5 shows a block diagram of a data processing system 500. The data processing system 500 comprises a server system 502 and a tape recording apparatus 504. The server system 502 executes a computer program product 506 on a microprocessor of the server system 502 (the microprocessor is not shown in FIG. 5). The computer program product 506 comprises a first thread 508 and a second thread 510. The server system 502 further executes a device driver 512 on the microprocessor of the server system 502.

The tape recording apparatus 504 comprises a write head 514, a read head 516, a memory buffer 517, and a tape 518. The running direction of the tape is indicated by the arrow. The device driver 512 provides a first device handle 520 and a second device handle 522, wherein the first device handle 520 relates to a first device special file name and wherein the second device handle 522 relates to a second device special file name. The first thread 508 communicates with the tape recording apparatus 504 via the first device special file name of the first device handle 520 and the second thread 510 is linked with the tape recording apparatus via the second device special file name of the second device handle 522.

The device handle 520 is linked with a fiber coupled interface 524 that is connected via connection 532 with a fiber coupled interface 528 of the tape recording apparatus 504. Similarly, the device handle 522 is linked with a fiber coupled interface 526 that is connected via connection 534 to a fiber coupled interface 530 on the tape recording apparatus 504. Thus due to the provision of two connections 532 and 534 associated with either the fiber coupled interfaces 524 and 528 or the fiber coupled interfaces 526 and 530, the device driver is able to represent the tape recording apparatus 504 as two logical tape recording apparatuses.

The first thread 508 transmits a sequence of data blocks, such as data block n 536, data block n+1 538, data block n+2 540, and data block n+3 542 via the device handle 520 and the connection 532 to the tape recording apparatus. The tape recording apparatus writes the sequence of data blocks 536, . . . , 542 to the tape 518. The positions where the data blocks 536, . . . , 542 are written on the tape 518 are indicated on FIG. 5.

The read head 516 furthermore re-reads the data blocks that have been written before by the write head. The read head has, e.g., read data block n−4 550, data block n−3 548, data block n−2 546, and data block n−1 544, and stored on the memory buffer 517 from where they are read out by the second thread 510.

Each of the re-read data blocks 544, . . . , 550 is compared with the original data blocks. The comparison can for example by based on a cyclic redundancy check as described before, e.g., in the description to FIG. 4.

If then, e.g., the data block n−2 546 is detected to be written incorrectly to the tape 518, the second thread 510 signals to the first thread 508 that the data block n−2 546 is not correctly stored. The tape is then rewound. The transmission of the sequence of data blocks starts again with data blocks 546, followed by data blocks 544, 536, 538 . . . .

Figure 6:
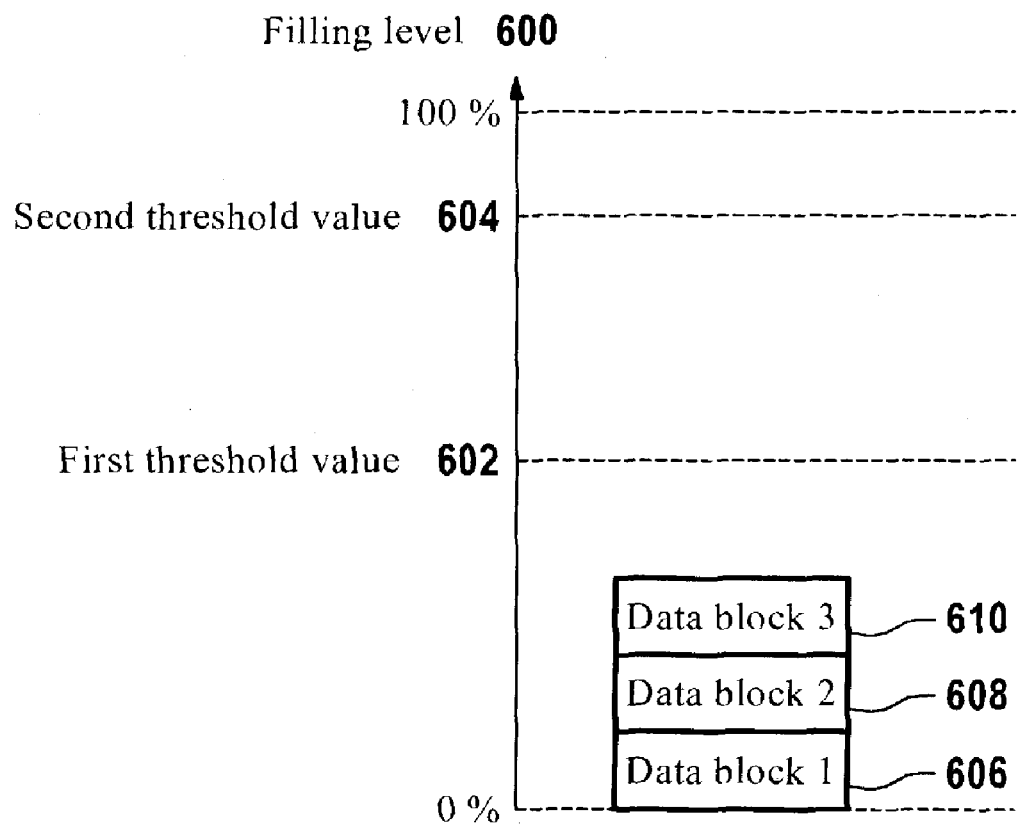
FIG. 6 shows schematically a graph of the filling level of a memory buffer.

FIG. 6 shows schematically a graph of the filling level 600 of the memory buffer. The filling level 600 relates to the amount of storage space that is occupied with respect to the total amount of storage space provided by the memory buffer. A filling level of zero percent therefore indicates that the memory buffer is completely empty, whereas a filling level of 100% indicates that the memory buffer is completely filled with data. The data blocks, such as data blocks 606, 608, and 610 are stored in the memory buffer after they have been read from the tape as described above. Each data block of the data blocks 606, 608, and 610 contributes to an increase of the filling level. The data blocks 606, 608, and 610 are stored by use of a first-in/first out algorithm. A first threshold value 602 and a second threshold value 604 are defined (they are for example stored on the storage device of the tape drive apparatus 104 from where they are accessible for the computer program product 130, cf. FIG. 1). As long as the re-read data blocks 606, 608, 610 do not fill up the memory buffer so that the filling level 600 exceeds the first threshold value 602, the tape recording apparatus operates at maximum write speed. As soon as the re-read data blocks 606, 608, 610 fill up the memory buffer so that the filling level 600 exceeds the first threshold value 602, the tape drive starts slowing down writes. This results in less further re-read data blocks put into the memory buffer by the tape recording apparatus because if less data blocks are written less data blocks are re-read and placed into the memory buffer. The tape recording apparatus is dynamically adjusting its write throughput depending on filling level between first and second threshold value 602 and 604. The tape recording apparatus is (minimally) slowing down writing data blocks to tape in case the filling level is equal to the first threshold value. The tape recording apparatus more and more slows down writing data blocks to tape until maximum slow down is reached at the point the filling level reaches the second threshold value 604. As soon as the filling level reaches the second threshold value 604, the tape recording apparatus may stop writing data blocks to the tape or may start deleting the re-read data blocks 606, 608, 610 from the memory buffer. Deleting re-read data blocks from the memory buffer is done using the FIFO algorithm (oldest re-read data block in memory buffer is deleted first). Stopping writing data blocks to tape allows the application to validate all data blocks in memory buffer but negatively affects write throughput because the tape recording apparatus needs to stop writing data blocks. The method of deleting re-read data blocks from the memory buffer does not allow the application to validate all re-read data blocks but does not have an impact on write throughput as the tape recording apparatus can continue writing to tape at any time. How the tape recording apparatus behaves when the filling level 600 reaches the second threshold value 604 can be controlled by the application, e.g., by sending instructions to the tape recording apparatus.

REFERENCE NUMERALS

100 Data processing system
102 Server system
104 Tape recording apparatus
106 Microprocessor
108 Storage device
110 Input device
112 Screen
114 Computer program product
116 Device driver
118 Connection
120 Microprocessor
122 Write head
124 Read head
126 Tape
128 Memory buffer
130 Computer program product
132 First thread
134 Second thread
136 Data block
138 Re-read data block
140 First message
400 First data
402 Second data
404 Third data
500 Data processing system
502 Server system
504 Tape recording apparatus
506 Computer program product
508 First thread
510 Second thread
512 Device driver
514 Write head
516 Read head
517 Memory buffer
518 Tape
520 Device handle
522 Device handle
524 Interface
526 Interface
528 Interface
530 Interface
532 Connection
534 Connection
536 Data block
538 Data block
540 Data block
542 Data block
544 Data block
546 Data block
548 Data block
550 Data block
600 Filling level
602 First threshold value
604 Second threshold value
606 Data block
608 Data block
610 Data block

What is claimed is:

1. A method of detecting corruption in a data block stored by a tape recording apparatus, the tape recording apparatus having a write head and a read head, the method comprising:

a) writing to a tape via the write head, wherein for the writing the tape moves past the write head in a predetermined direction, wherein the tape recording apparatus is linked with a computer system executing an application and a device driver, the tape recording apparatus being accessible by the application through the device driver via first and second tasks, and wherein the writing includes writing a first data block responsive to transmitting the first data block from the computer system;

b) reading the written data block from the tape via the read head, wherein for the reading the tape moves past the read head in the same, predetermined direction, and wherein the reading of the first data block occurs without reversing the tape movement after the writing of the first data block; and c) comparing at least portions of the transmitted and read data blocks by the tape recording apparatus; and d) sending an Input/Output message or interrupt signal to the second task from the tape recording apparatus responsive to a noncorruption indication determined by the comparing, wherein transmitting the first data block from the computer system includes transmitting by the first task; and wherein the method comprises:

e) storing in a memory buffer of the tape recording apparatus the data block read from the tape in b); and f) reading, via the second task, the data block stored in the memory buffer;

g) comparing, via the second task, at least portions of the transmitted data block and the data block read from the memory buffer, wherein the reading of the data block stored in the memory buffer includes reading after the Input/Output message or interrupt signal is received by the second task from the tape recording apparatus.

2. The method of claim 1, wherein the method comprises:
transmitting and writing additional data blocks to the tape and the tape recording apparatus sending a corruption message to the first task indicating that the read data block has been stored incorrectly;
aborting the transmitting of data blocks via the first task in response to the reception of the first message; and
re-transmitting the first data block to the tape recording apparatus via the first task and responsively re-writing the first data block to the tape, including overwriting the first data block or invalidating the first data block and appending the re-transmitted first data block on the tape.

3. The method of claim 1, comprising:
performing a first cyclic redundancy check on first data prior to the writing of the first block to the tape, including generating second data responsive to the cyclic redundancy check, wherein the first data block written to the tape includes the first and second data, and wherein the comparing in c) comprises:
performing a second cyclic redundancy check on the first data of the data block read from the tape.

4. The method of claim 1, wherein the comparing in c) comprises:
comparing each respective bit of the transmitted and read data blocks.

5. The method of claim 1, comprising:
repeating a) through e) for additional data blocks, wherein the memory buffer tends to fill if storing to the memory buffer exceeds reading from the memory buffer, wherein the moving of the tape is at a first speed responsive to filling of the memory buffer not exceeding a limit, and wherein the moving of the tape slows responsive to filling of the memory buffer exceeding the limit.

6. A computer program product stored on a tangible, computer readable medium for detecting corruption in a data block stored by a tape recording apparatus, the tape recording apparatus having a write head and a read head, wherein the tape recording apparatus is linked with a computer system executing an application and a device driver, the tape recording apparatus being accessible by the application through the device driver via first and second tasks said computer program product having instructions for execution by the computer, which, when executed by the computer, cause the computer to implement a method comprising the steps of:

a) transmitting data to the tape recording apparatus by the first task for writing to a tape via the write head, wherein for the writing the tape moves past the write head in a predetermined direction, wherein the transmitting includes transmitting a first data block for writing to the tape;

b) the tape recording apparatus reading the written data block from the tape via the read head, wherein for the reading the tape moves past the read head in the same, predetermined direction, and wherein the reading of the first data block occurs without reversing the tape movement after the writing of the first data block, and wherein the tape recording apparatus stores the data block read from the tape in a memory buffer of the tape recording apparatus;

c) comparing at least portions of the transmitted and read data blocks by the tape recording apparatus; and d) sending an Input/Output message or interrupt signal to the second task from the tape recording apparatus responsive to a noncorruption indication determined by the comparing, wherein transmitting the first data block from the computer system includes transmitting by the first task; and wherein the computer program product comprises:

e) storing in a memory buffer of the tape recording apparatus the data block read from the tape in b); and f) reading, via the second task, the data block stored in the memory buffer;

g) comparing, via the second task, at least portions of the transmitted data block and the data block read from the memory buffer, wherein the reading of the data block stored in the memory buffer includes reading after the Input/Output message or interrupt signal is received by the second task from the tape recording apparatus.

7. The computer program product of claim 6, wherein the method implemented by the computer executing the instructions of the computer program product comprises:

transmitting additional data blocks via the first task and writing the additional data blocks to the tape and the tape recording apparatus sending a corruption message to the first task indicating that the read data block has been stored incorrectly;

aborting the transmitting of data blocks in response to the reception of the first message;

re-transmitting the first data block via the first task to the tape recording apparatus, wherein responsive to the re-transmitting the first data block is re-written to the tape, including overwriting the first data block or invalidating the first data block and appending the re-transmitted first data block on the tape.

8. The computer program product of claim 6, wherein the method implemented by the computer executing the instructions of the computer program product comprises:

performing a first cyclic redundancy check on first data prior to the writing of the first block to the tape, including generating second data responsive to the cyclic redundancy check, wherein the first data block written to the tape includes the first and second data, and wherein the comparing in c) comprises:

performing a second cyclic redundancy check on the first data of the data block read from the tape.

9. The computer program product of claim 6, wherein the comparing in c) comprises:

comparing each respective bit of the transmitted and read data blocks.

10. The computer program product of claim 6, comprising:

repeating a) through e) for additional data blocks, wherein the memory buffer tends to fill if storing to the memory buffer exceeds reading from the memory buffer, wherein the moving of the tape is at a first speed responsive to filling of the memory buffer not exceeding a limit, and wherein the moving of the tape slows responsive to filling of the memory buffer exceeding the limit.

11. A computer system comprising:

a tape recording apparatus having a memory buffer, a write head and a read head, wherein for writing respective data blocks to a tape the apparatus is operable to move the tape past the write head in a predetermined direction, and for reading the data blocks the apparatus is operable to move the tape past the read head in the same, predetermined direction, the reading of the data blocks occurring without reversing the tape movement after the writing of the respective data blocks, and wherein the tape recording apparatus is operable to store the data blocks read from the tape in the memory buffer;

a processor; and a storage device connected to the processor, wherein the storage device has stored thereon a data control application program for controlling the processor and a device driver for accessing the tape recording apparatus via first and second tasks of the data control application program, and wherein the processor is operative to execute instructions of the program to implement a method comprising the steps of:

a) transmitting data to the tape recording apparatus by the first task for writing to the tape, wherein the transmitting includes transmitting a first data block for the writing;

b) the tape recording apparatus reading the written first data block from the tape via the read head;

c) comparing at least portions of the transmitted and read data blocks by the tape recording apparatus; and d) sending an Input/Output message or interrupt signal to the second task from the tape recording apparatus responsive to a noncorruption indication determined by the comparing, wherein transmitting the first data block from the computer system includes transmitting by the first task; and wherein the method comprises:

e) storing in a memory buffer of the tape recording apparatus the data block read from the tape in b); and f) reading, via the second task, the data block stored in the memory buffer;

g) comparing, via the second task, at least portions of the transmitted data block and the data block read from the memory buffer, wherein the reading of the data block stored in the memory buffer includes reading after the Input/Output message or interrupt signal is received by the second task from the tape recording apparatus.

12. The computer system of claim 11, wherein the method implemented by the computer executing the instructions of the computer program comprises:

transmitting additional data blocks via the first task and writing the additional data blocks to the tape, and the tape recording apparatus sending a corruption message indicating that the read data block has been stored incorrectly;

aborting the transmitting of data blocks in response to the reception of the first message;

re-transmitting the first data block via the first task to the tape recording apparatus, wherein responsive to the re-transmitting the first data block is re-written to the tape, including overwriting the first data block or invalidating the first data block and appending the re-transmitted first data block on the tape.

13. The computer system of claim 11, wherein the method implemented by the computer executing the instructions of the computer program comprises:

performing a first cyclic redundancy check on first data prior to the writing of the first block to the tape, including generating second data responsive to the cyclic redundancy check, wherein the first data block written to the tape includes the first and second data, and wherein the comparing in c) comprises:

performing a second cyclic redundancy check on the first data of the data block read from the tape.

14. The computer system of claim 11, wherein the comparing in c) comprises:

comparing each respective bit of the transmitted and read data blocks.

15. The computer system of claim 11, comprising:

repeating a) through e) for additional data blocks, wherein the memory buffer tends to fill if storing to the memory buffer exceeds reading from the memory buffer, wherein the moving of the tape is at a first speed responsive to filling of the memory buffer not exceeding a limit, and wherein the moving of the tape slows responsive to filling of the memory buffer exceeding the limit.

* * * * *